(12) United States Patent
Yoshizumi (10) Patent No.: US 11,958,405 B2
(45) Date of Patent: Apr. 16, 2024

(54) ILLUMINATION DEVICE

(71) Applicant: Panasonic Intellectual Property Management Co., Ltd., Osaka (JP)

(72) Inventor: Ryota Yoshizumi, Fukui (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/356,827

(22) Filed: Jul. 21, 2023

(65) Prior Publication Data

US 2024/0034228 A1  Feb. 1, 2024

(30) Foreign Application Priority Data

Jul. 29, 2022 (JP) ................. 2022-121585

(51) Int. Cl.
*B60Q 3/51* (2017.01)
*B60H 3/06* (2006.01)
*B60Q 3/64* (2017.01)

(52) U.S. Cl.
CPC ............. *B60Q 3/51* (2017.02); *B60H 3/0608* (2013.01); *B60Q 3/64* (2017.02)

(58) Field of Classification Search
CPC .......... B60Q 3/64; B60Q 3/51; B60H 3/0608
USPC ............... 362/490, 580, 545, 511, 96
See application file for complete search history.

(56) References Cited

U.S. PATENT DOCUMENTS

| | | | |
|---|---|---|---|
| 7,438,452 B2* | 10/2008 | Nawashiro | B60Q 3/82 362/490 |
| 11,686,467 B1* | 6/2023 | Yuan | F04D 25/166 362/96 |
| 2018/0231241 A1* | 8/2018 | Hung | F04D 29/522 |

FOREIGN PATENT DOCUMENTS

JP  2007045185 A  2/2007

* cited by examiner

*Primary Examiner* — Laura K Tso
(74) *Attorney, Agent, or Firm* — Seed IP Law Group LLP (57) ABSTRACT

An illumination device is to be mounted on a ceiling of an interior of a vehicle, and the illumination device includes a light source that emits light to illuminate the interior, a light guide that receives the light emitted from the light source and transmits the received light, a first flow path that, in a state in which the illumination device is mounted on the ceiling, extends so as to intersect with an up and down direction of the vehicle and is located at the same position as at least one of the light source or the light guide in the up and down direction, and an air blower that produces an airflow that, having been sucked into the illumination device, travels through the first flow path and is blown out of the illumination device after having traveled through the first flow path.

9 Claims, 5 Drawing Sheets

ILLUMINATION DEVICE

CROSS REFERENCE TO RELATED APPLICATION

The present application is based on and claims priority of Japanese Patent Application No. 2022-121585 filed on Jul. 29, 2022.

FIELD

The present disclosure relates to an illumination device.

BACKGROUND

Conventionally, an illumination device provided within an interior of a vehicle is known. For example, as one example of an illumination device, Patent Literature (PTL) 1 discloses an air cleaner for a vehicle. This air cleaner includes a casing having an air passage formed therein, and indirect lighting is disposed in a space between the casing and a ceiling.

CITATION LIST

Patent Literature

PTL 1: Japanese Unexamined Patent Application Publication No. 2007-45185

SUMMARY

However, the air cleaner for a vehicle according to PTL 1 can be improved upon.

In view of this, the present disclosure provides an illumination device capable of improving upon the above related art.

An illumination device according to one aspect of the present disclosure is an illumination device to be mounted on a ceiling of an interior of a vehicle, and the illumination device includes: a light source that emits light to illuminate the interior; a light guide that receives the light emitted from the light source and transmits the light received; a first flow path that, in a state in which the illumination device is mounted on the ceiling, extends to intersect with an up and down direction of the vehicle and is located at a same position as at least one of the light source or the light guide in the up and down direction; and an air blower that produces an airflow that, having been sucked into the illumination device, travels through the first flow path and is blown out of the illumination device after traveling through the first flow path.

An illumination device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

According to the air cleaner for a vehicle disclosed in PTL 1, the indirect lighting is disposed in a space between the ceiling and the casing. A problem with this configuration is that the air cleaner for a vehicle tends to have a large dimension in the up and down direction of the vehicle.

In view of such an issue, the present disclosure provides an illumination device that can be kept from having a large dimension in the up and down direction of the vehicle.

An illumination device according to one aspect of the present disclosure is an illumination device to be mounted on a ceiling of an interior of a vehicle, and the illumination device includes a light source that emits light to illuminate the interior, a light guide that receives the light emitted from the light source and transmits the received light, a first flow path that, in a state in which the illumination device is mounted on the ceiling, extends to intersect with an up and down direction of the vehicle and is located at the same position as at least one of the light source or the light guide in the up and down direction, and an air blower that produces an airflow that, having been sucked into the illumination device, travels through the first flow path and is blown out of the illumination device after having traveled through the first flow path.

According to this aspect, in a state in which the illumination device is mounted on the ceiling, the first flow path extends so as to intersect with the up and down direction of the vehicle and is located at the same position as at least one of the light source or the light guide in the up and down direction. This configuration, therefore, can prevent a situation in which the first flow path aligns with at least one of the light source or the light guide in the up and down direction of the vehicle, which in turn can keep the illumination device from having a large dimension in the up and down direction of the vehicle.

Herein, that the first flow path is located at the same position as the light source in the up and down direction of the vehicle in a state in which the illumination device is mounted on the ceiling includes a case in which, in a state in which the illumination device is mounted on the ceiling, at least a portion of the first flow path is located at the same position as at least a portion of the light source in the up and down direction of the vehicle. Similarly, that the first flow path is located at the same position as the light guide in the up and down direction of the vehicle in a state in which the illumination device is mounted on the ceiling includes a case in which, in a state in which the illumination device is mounted on the ceiling, at least a portion of the first flow path is located at the same position as at least a portion of the light guide in the up and down direction of the vehicle.

Furthermore, in the illumination device according to one aspect of the present disclosure, the first flow path may be located at the same position as the light guide in the up and down direction in a state in which the illumination device is mounted on the ceiling, the light guide may include a first surface on a side opposite a side facing the first flow path and a second surface facing the first flow path, and the illumination device may further include a second flow path that opens at each of the first surface and the second surface and that is connected to the first flow path.

According to this aspect, the second flow path opens at each of the first surface and the second surface of the light guide and is connected to the first flow path. Accordingly, even in a case in which the first flow path and the light guide are located at the same position in the up and down direction of the vehicle in a state in which the illumination device is mounted on the ceiling, the airflow can be kept from being obstructed by the light guide.

Furthermore, in the illumination device according to one aspect of the present disclosure, the light guide may include a notch that is recessed upward in the up and down direction in a state in which the illumination device is mounted on the ceiling, the notch may be formed from the first surface to the second surface, and a portion of the second flow path may be formed by the notch.

According to this aspect, a portion of the second flow path can be formed easily with the notch in the light guide.

Furthermore, in the illumination device according to one aspect of the present disclosure, the first surface may include a first inclined surface that, in a state in which the illumination device is mounted on the ceiling, is inclined away from where the second surface is located as a position on the first inclined surface moves upward in the up and down direction.

According to this aspect, the airflow blown out through an opening in the first surface can be made to travel along the first inclined surface, and thus, in a state in which the illumination device is mounted on the ceiling, the airflow can be made to travel diagonally upward.

Furthermore, the illumination device according to one aspect of the present disclosure may further include a housing that opens upward in the up and down direction in a state in which the illumination device is mounted on the ceiling and that houses the light source and the light guide, the housing may include a wall portion located on an opposite side of the first surface from the second surface, and the first inclined surface may rise above the wall portion in the up and down direction in a state in which the illumination device is mounted on the ceiling.

According to this aspect, in a state in which the illumination device is mounted on the ceiling, the airflow blown out through an opening in the first surface can be made to travel diagonally upward with ease.

Furthermore, in the illumination device according to one aspect of the present disclosure, in a state in which the illumination device is mounted on the ceiling, the light source may be located below the light guide in the up and down direction and emits the light upward in the up and down direction; the second surface may include a second inclined surface that, in a state in which the illumination device is mounted on the ceiling, is inclined toward where the first surface is located as a position on the second inclined surface moves upward in the up and down direction; the light guide may include an entry surface that is located above the light source in the up and down direction in a state in which the illumination device is mounted on the ceiling and that receives the light emitted from the light source, and an exit surface that extends downward in the up and down direction from the second surface to the first surface in a state in which the illumination device is mounted on the ceiling and that transmits the light received via the entry surface; the second inclined surface may reflect the light that has entered the light guide via the entry surface toward the first inclined surface; the first inclined surface may reflect the light reflected by the second inclined surface toward the exit surface; and the exit surface may transmits the light reflected by the first inclined surface out of the light guide.

According to this aspect, the light emitted from the light source can be made to exit from the light guide after having been reflected within the light guide, and thus the light emitted from the light source can be diffused, and the interior can be illuminated with this diffused light.

Furthermore, in the illumination device according to one aspect of the present disclosure, the exit surface may be a concave surface.

According to this aspect, the light emitted from the light source can be further diffused, and the interior can be illuminated with this further diffused light.

Furthermore, the illumination device according to one aspect of the present disclosure may further include a plurality of light sources and a housing that houses the plurality of light sources and the light guide, the plurality of light sources may be arranged annularly along an outer peripheral portion of the housing as viewed in the up and down direction in a state in which the illumination device is mounted on the ceiling, and the light guide may overlap the plurality of light sources and have an annular shape as viewed in the up and down direction, in a state in which the illumination device is mounted on the ceiling.

According to this aspect, the surroundings of the housing can be illuminated with ease.

Furthermore, the illumination device according to one aspect of the present disclosure may further include an air cleaner that cleans an air in the interior with use of the airflow.

According to this aspect, the air in the interior of the vehicle can be cleaned with ease.

Hereinafter, some embodiments will be described in concrete terms with reference to the drawings.

It is to be noted that the embodiments described below merely illustrate general or specific examples. The numerical values, the shapes, the materials, the constituent elements, the arrangement positions and the connection modes of the constituent elements, the steps, the order of the steps, and so forth illustrated in the following embodiments are examples and are not intended to limit the present disclosure. Among the constituent elements described according to the following embodiments, any constituent element that is not cited in the independent claims is to be construed as an optional constituent element.

Moreover, the drawings are schematic diagrams and do not necessarily provide exact depictions. Furthermore, in the drawings, any constituent elements that are identical are given identical reference characters.

Embodiment

Figure 1:
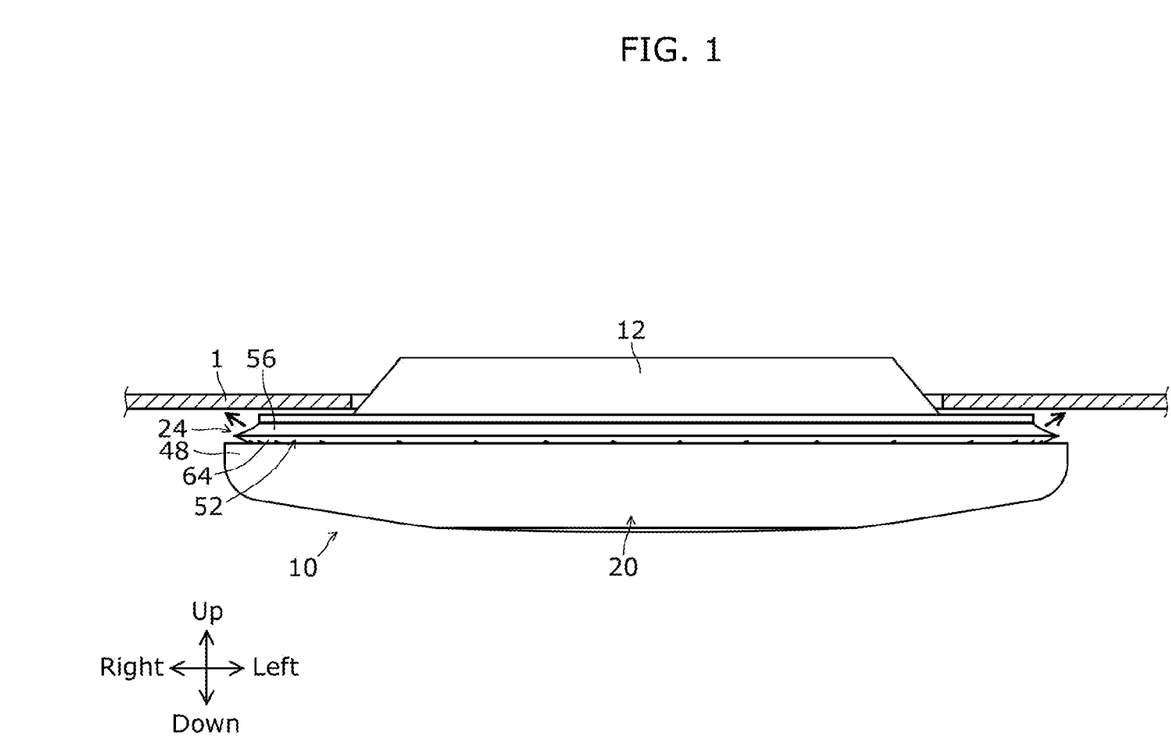
FIG. 1 is a front view showing an illumination device and so forth according to one embodiment.
Figure 2:
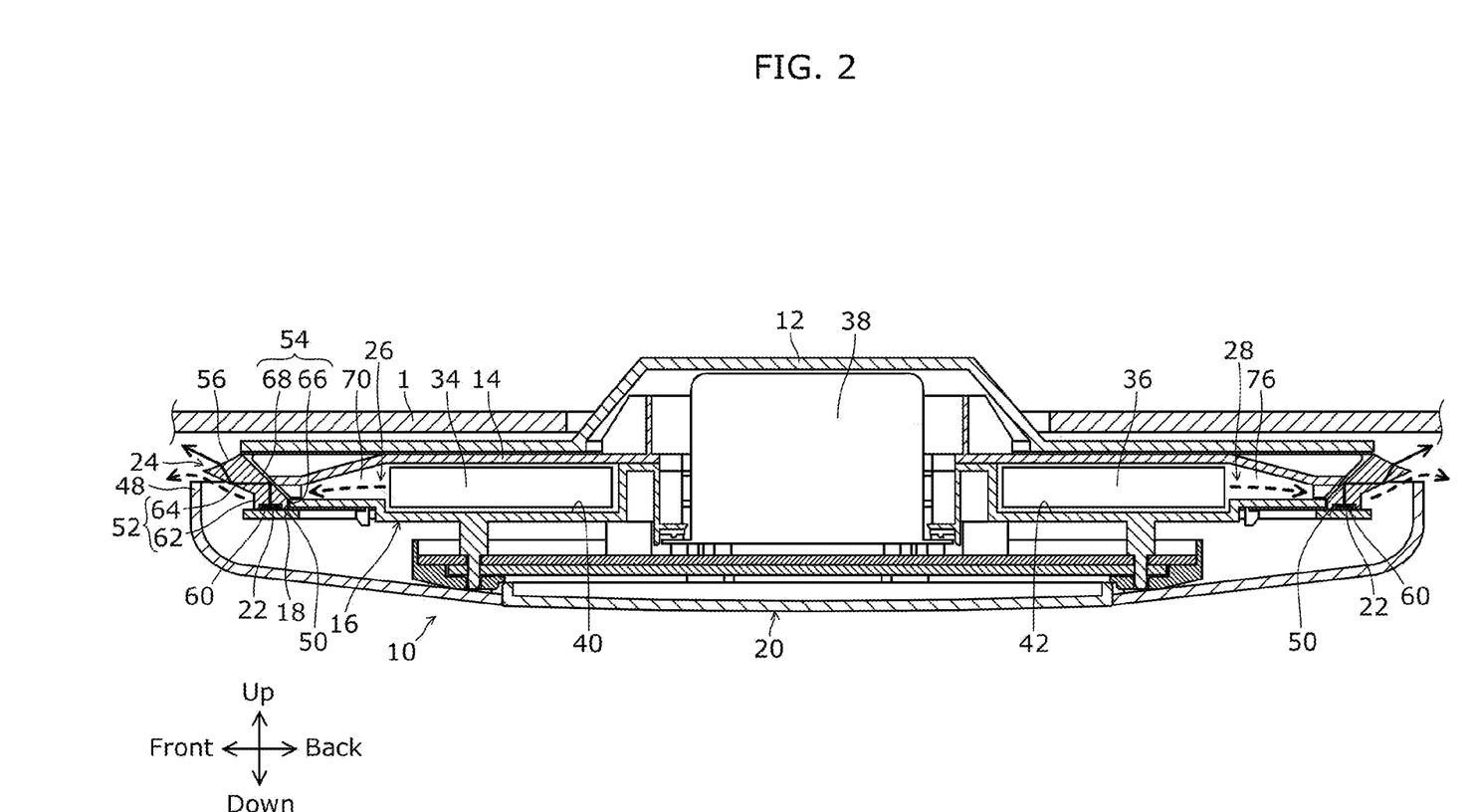
FIG. 2 is a sectional view showing the illumination device and so forth shown in FIG. 1.
Figure 3:
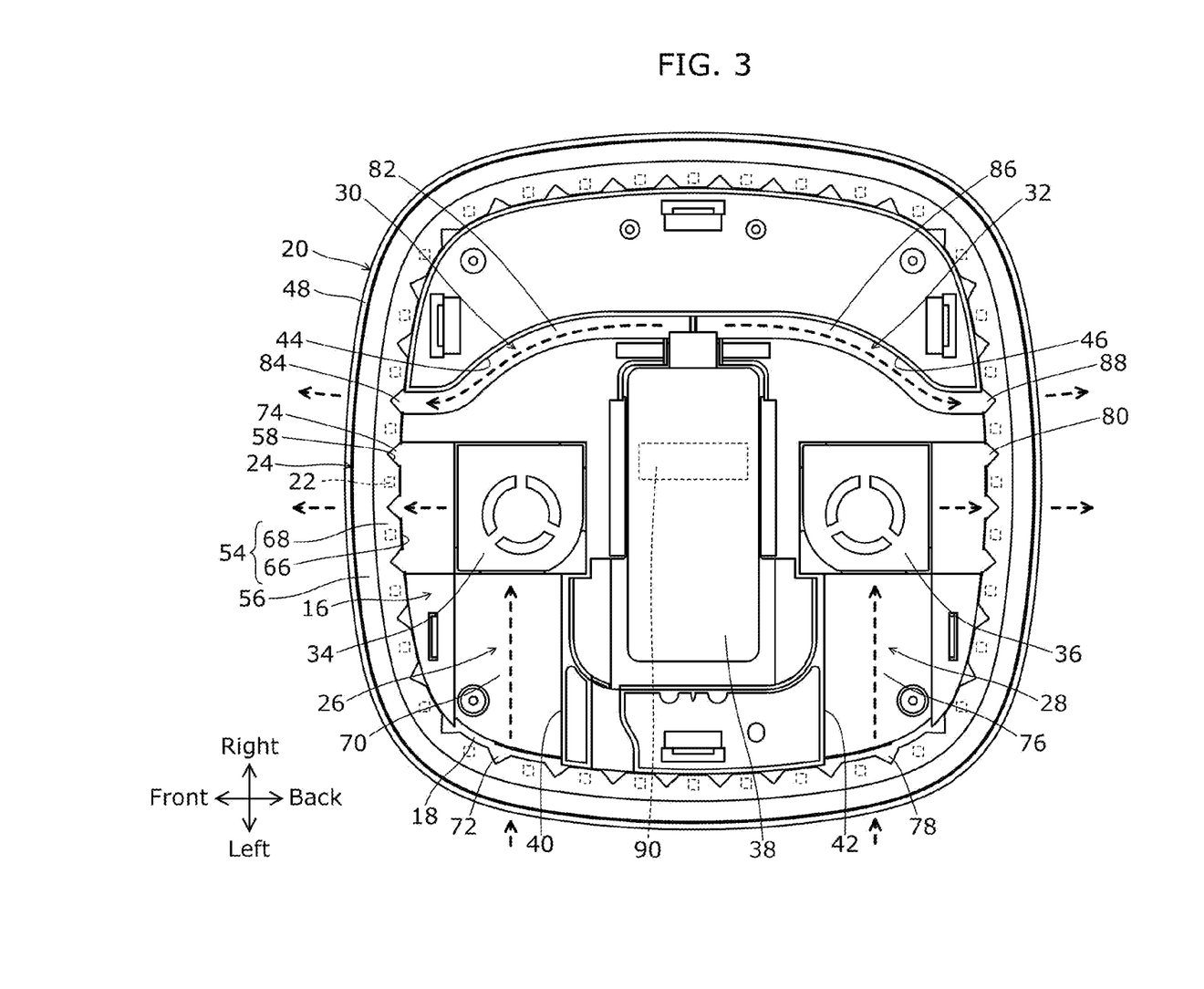
FIG. 3 is a plan view showing a portion of the illumination device shown in FIG. 1.
Figure 4:
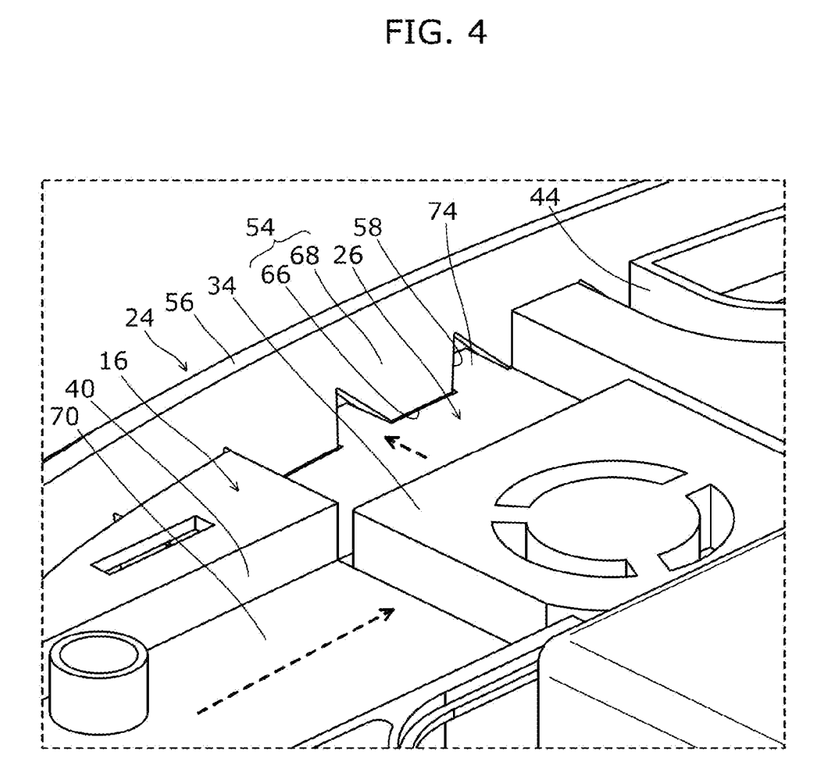
FIG. 4 is a perspective view showing a portion of the illumination device shown in FIG. 1.
Figure 5:
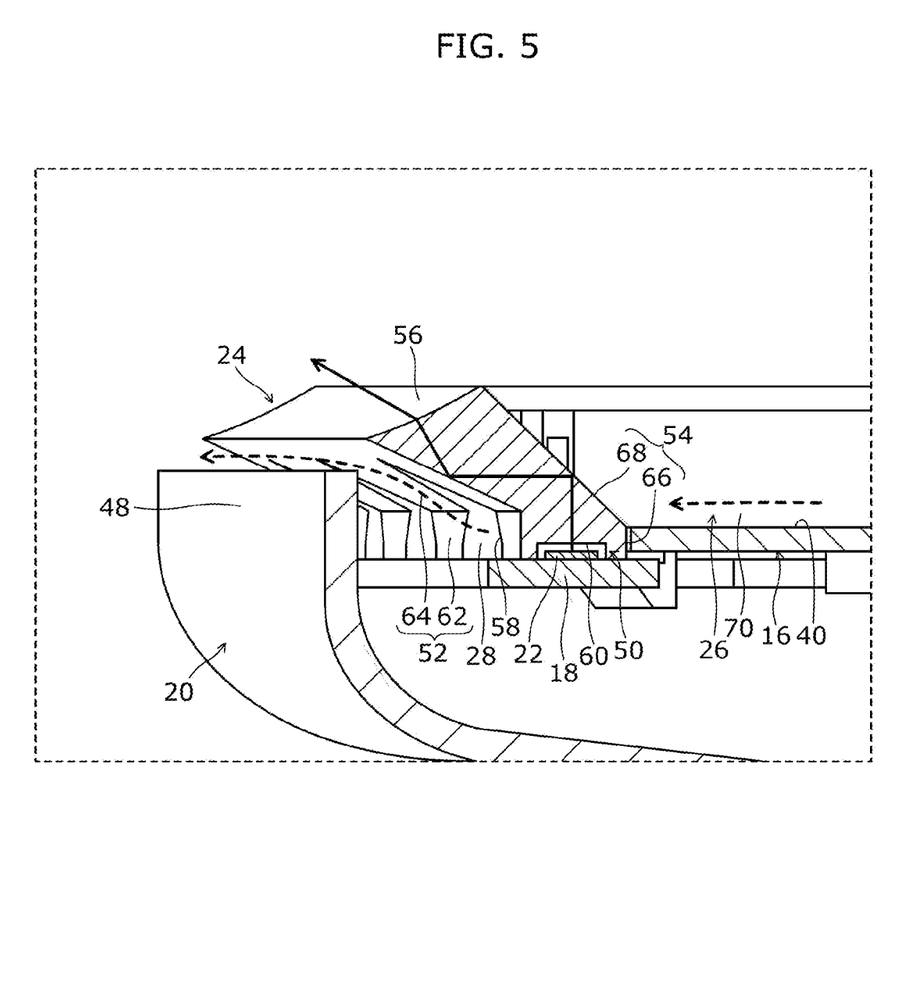
FIG. 5 is a perspective sectional view showing a portion of the illumination device shown in FIG. 1.

FIG. 1 is a front view showing illumination device 10 and so forth according to one embodiment. FIG. 1 shows illumination device 10 and so forth as they are viewed from the front side in the front and back direction of a vehicle. In FIG. 1, ceiling 1 is shown in section. FIG. 2 is a sectional view showing illumination device 10 and so forth shown in FIG. 1. FIG. 2 shows a section of illumination device 10 and so forth taken along a plane orthogonal to the right and left direction of the vehicle, and illumination device 10 and so forth are viewed from the left side in the right and left direction of the vehicle. In FIG. 2, air blowers 34 and 36 and air cleaner 38 are shown not in section, and their outer appearances are shown. FIG. 3 is a plan view showing a portion of illumination device 10 shown in FIG. 1. FIG. 3 omits mounting portion 12 and cover portion 14. FIG. 4 is a perspective view showing a portion of illumination device 10 shown in FIG. 1. Specifically, FIG. 4 is a perspective view showing light guide 24 and its vicinity of illumination device 10. FIG. 4 omits mounting portion 12 and cover portion 14. FIG. 5 is a perspective sectional view showing a portion of illumination device 10 shown in FIG. 1. Specifically, FIG. 5 is a perspective sectional view showing light guide 24 and its vicinity of illumination device 10. FIG. 5 omits mounting portion 12 and cover portion 14.

In the following description, the front and back direction of a vehicle may also be referred to simply as the front and back direction. Similarly, the right and left direction of the vehicle may also be referred to simply as the right and left direction, and the up and down direction of the vehicle may also be referred to simply as the up and down direction.

As shown in FIG. 1, illumination device 10 is mounted onto ceiling 1 of an interior of a vehicle. In other words, illumination device 10 is located within the interior of the vehicle and mounted on ceiling 1 of the vehicle. The vehicle is, for example but not limited to, a car, a ship, or an aircraft. A car is, for example but not limited to, an automobile. Illumination device 10 illuminates the interior of the vehicle. According to the present embodiment, illumination device 10 is an indirect illumination device and illuminates the interior of the vehicle indirectly. Specifically, illumination device 10 illuminates the interior of the vehicle indirectly by illuminating ceiling 1 with light (see the thick arrows shown in FIG. 1). However, illumination device 10, for example, does not have to be an indirect illumination device and may illuminate the interior of the vehicle directly. Specifically, for example, illumination device 10 may illuminate the interior of the vehicle directly by emitting light in the direction away from ceiling 1.

As shown in FIG. 1 to FIG. 5, illumination device 10 includes mounting portion 12, cover portion 14, main body portion 16, substrate 18, housing 20, a plurality of light sources 22, light guide 24, a plurality of flow paths 26, 28, 30, and 32, a plurality of air blowers 34 and 36, and air cleaner 38.

Mounting portion 12 is mounted on ceiling 1. For example, mounting portion 12 is mounted on ceiling 1 with a bolt (not illustrated) or the like.

Cover portion 14 is mounted on mounting portion 12. For example, cover portion 14 includes a hook portion (not illustrated) to be hooked onto mounting portion 12, and as this hook portion is hooked onto mounting portion 12, cover portion 14 becomes mounted on mounting portion 12. In a state in which illumination device 10 is mounted on ceiling 1, cover portion 14 is located above main body portion 16. According to the present embodiment, the outer peripheral portion of cover portion 14 as viewed in the up and down direction in a state in which illumination device 10 is mounted on ceiling 1 is located, in the up and down direction, above second inclined surface 68 included in second surface 54 of light guide 24, described later, and opposes second inclined surface 68.

Main body portion 16 is mounted on cover portion 14. For example, main body portion 16 is mounted on cover portion 14 with a bolt (not illustrated) or the like. Main body portion 16 includes a plurality of groove portions 40, 42, 44, and 46. In a state in which illumination device 10 is mounted on ceiling 1, each of the plurality of groove portions 40, 42, 44, and 46 is recessed downward in the up and down direction and extends in a direction intersecting with the up and down direction.

Substrate 18 is a substrate onto which the plurality of light sources 22 are to be fixed. Substrate 18, along with main body portion 16, is mounted on cover portion 14. In a state in which illumination device 10 is mounted on ceiling 1, substrate 18 overlaps each of the plurality of light sources 22 and has an annular shape, as viewed in the up and down direction.

Housing 20 houses the plurality of light sources 22 and light guide 24. In a state in which illumination device 10 is mounted on ceiling 1, housing 20 opens upward in the up and down direction and is provided so as to be located below and to the side of the plurality of light sources 22, light guide 24, and so forth. Housing 20 is mounted on main body portion 16. For example, housing 20 is mounted on main body portion 16 with a bolt (not illustrated) or the like. Housing 20 includes wall portion 48.

Wall portion 48 is located on an opposite side of first surface 52 of light guide 24, described later, from second surface 54. In a state in which illumination device 10 is mounted on ceiling 1, wall portion 48 has an annular shape as viewed in the up and down direction. Wall portion 48 opposes first surface 52 with a space therebetween.

The plurality of light sources 22 each emit light to illuminate the interior of the vehicle. According to the present embodiment, light emitted from each of the plurality of light sources 22 enters light guide 24, exits from light guide 24 after having traveled through light guide 24, and is reflected by ceiling 1 after having exited from light guide 24 to illuminate the interior of the vehicle. The plurality of light sources 22 are each, for example but not limited to, a light emitting diode (LED) light source.

In a state in which illumination device 10 is mounted on ceiling 1, each of the plurality of light sources 22 is located below light guide 24 in the up and down direction and emits light upward in the up and down direction.

In a state in which illumination device 10 is mounted on ceiling 1, the plurality of light sources 22 are arranged annularly as viewed in the up and down direction (see the dashed rectangle shown in FIG. 3). According to the present embodiment, in a state in which illumination device 10 is mounted on ceiling 1, the plurality of light sources 22 are arranged annularly along the outer peripheral portion of housing 20 as viewed in the up and down direction. Specifically, according to the present embodiment, in a state in which illumination device 10 is mounted on ceiling 1, the plurality of light sources 22 are arranged annularly along wall portion 48 as viewed in the up and down direction.

Light guide 24 receives light emitted from each of the plurality of light sources 22, and the light that has entered light guide 24 exits from light guide 24. In a state in which illumination device 10 is mounted on ceiling 1, light guide 24 overlaps the plurality of light sources 22 and has an annular shape, as viewed in the up and down direction. According to the present embodiment, light guide 24 is formed of a single member having an annular shape. Herein, light guide 24 may be formed into an annular shape as, for example, a plurality of members are arranged annularly. As shown in FIG. 2, FIG. 5, and so forth, light guide 24 includes a plurality of recess portions 50, first surface 52, second surface 54, exit surface 56, and a plurality of notches 58.

The plurality of recess portions 50 house the plurality of light sources 22. The plurality of recess portions 50 are provided so as to correspond one-to-one to the plurality of light sources 22. In the inside of each of the plurality of recess portions 50, of the plurality of light sources 22, one light source 22 corresponding to that recess portion 50 is disposed. In a state in which illumination device 10 is mounted on ceiling 1, each of the plurality of recess portions 50 is recessed upward in the up and down direction. In a state in which illumination device 10 is mounted on ceiling 1, the plurality of recess portions 50 are arranged annularly as viewed in the up and down direction.

In a state in which illumination device 10 is mounted on ceiling 1, bottom surface 60 of each of the plurality of recess portions 50 is located above light source 22 in the up and down direction. Bottom surface 60 is one example of an entry surface onto which light emitted from light source 22 becomes incident.

As shown in FIG. 2, FIG. 5, and so forth, first surface 52 is a surface on an opposite side of light guide 24 from a first flow path. In other words, according to the present embodiment, first surface 52 is a surface on an opposite side of light guide 24 from flow path (76, 82, 86). In a state in which illumination device 10 is mounted on ceiling 1, first surface 52 has an annular shape as viewed in the up and down direction. First surface 52 includes vertical surface 62 and first inclined surface 64.

In a state in which illumination device 10 is mounted on ceiling 1, vertical surface 62 is a surface parallel to the up and down direction. In a state in which illumination device 10 is mounted on ceiling 1, vertical surface 62 extends annularly as viewed in the up and down direction. Specifically, in a state in which illumination device 10 is mounted on ceiling 1, vertical surface 62 extends annularly along the array of the plurality of light sources 22 as viewed in the up and down direction.

In a state in which illumination device 10 is mounted on ceiling 1, first inclined surface 64 is inclined in a direction away from where second surface 54 is located as a position on first inclined surface 64 moves upward in the up and down direction. In a state in which illumination device 10 is mounted on ceiling 1, first inclined surface 64 is connected to the upper end portion of vertical surface 62. In a state in which illumination device 10 is mounted on ceiling 1, first inclined surface 64 extends annularly as viewed in the up and down direction. Specifically, in a state in which illumination device 10 is mounted on ceiling 1, first inclined surface 64 extends annularly along the array of the plurality of light sources 22 as viewed in the up and down direction. In a state in which illumination device 10 is mounted on ceiling 1, first inclined surface 64 rises above wall portion 48 in the up and down direction. In other words, in a state in which illumination device 10 is mounted on ceiling 1, first inclined surface 64 extends from a height lower than the upper end portion of wall portion 48 to a height higher than the upper end portion of wall portion 48. First inclined surface 64 reflects light that has been emitted from light source 22 and has entered light guide 24. For example, first inclined surface 64 reflects light that has been reflected by second inclined surface 68 toward exit surface 56.

As shown in FIG. 2, FIG. 5, and so forth, second surface 54 is a surface, of light guide 24, that faces a first flow path. In other words, according to the present embodiment, second surface 54 is a surface facing flow path 70 (76, 82, 86). In a state in which illumination device 10 is mounted on ceiling 1, second surface 54 extends annularly as viewed in the up and down direction. Second surface 54 includes vertical surface 66 and second inclined surface 68.

In a state in which illumination device 10 is mounted on ceiling 1, vertical surface 66 is a surface parallel to the up and down direction. In a state in which illumination device 10 is mounted on ceiling 1, vertical surface 66 extends annularly as viewed in the up and down direction. Specifically, in a state in which illumination device 10 is mounted on ceiling 1, vertical surface 66 extends annularly along the array of the plurality of light sources 22 as viewed in the up and down direction.

In a state in which illumination device 10 is mounted on ceiling 1, second inclined surface 68 is inclined in a direction toward where first surface 52 is located as a position on second inclined surface 68 moves upward in the up and down direction. In a state in which illumination device 10 is mounted on ceiling 1, second inclined surface 68 is connected to the upper end portion of vertical surface 66. In a state in which illumination device 10 is mounted on ceiling 1, second inclined surface 68 extends annularly as viewed in the up and down direction. Specifically, in a state in which illumination device 10 is mounted on ceiling 1, second inclined surface 68 extends annularly along the array of the plurality of light sources 22 as viewed in the up and down direction. Second inclined surface 68 reflects light that has been emitted from light source 22 and has entered light guide 24. For example, second inclined surface 68 reflects light that has entered light guide 24 via bottom surface 60 toward first inclined surface 64.

In a state in which illumination device 10 is mounted on ceiling 1, exit surface 56 extends downward in the up and down direction from second surface 54 to first surface 52. Exit surface 56 allows light that has entered light guide 24 via bottom surface 60 to exit via exit surface 56. Exit surface 56 allows light reflected by first inclined surface 64 to exit via exit surface 56. Exit surface 56 is a concave surface. Herein, exit surface 56 may be, for example, a convex surface or a planar surface.

According to the present embodiment, light emitted from each of the plurality of light sources 22 enters light guide 24 via bottom surface 60, is reflected, for example, by second inclined surface 68, is reflected by first inclined surface 64 after having been reflected by second inclined surface 68, and exits to the outside of light guide 24 via exit surface 56 after having been reflected by first inclined surface 64 (see the thick solid arrows shown in FIG. 2 and FIG. 5).

Each of the plurality of notches 58 is recessed upward in the up and down direction in a state in which illumination device 10 is mounted on ceiling 1, and is formed from first surface 52 to second surface 54. According to the present embodiment, in a state in which illumination device 10 is mounted on ceiling 1, each of the plurality of notches 58 is recessed in a substantially V shape that gradually becomes narrower toward the upper side in the up and down direction. Herein, in a state in which illumination device 10 is mounted on ceiling 1, each of the plurality of notches 58 may be recessed in, for example but not limited to, a substantially U shape. In a state in which illumination device 10 is mounted on ceiling 1, the plurality of notches 58 are arranged annularly as viewed in the up and down direction. The plurality of notches 58 are arranged such that one notch 58 is located between two adjacent light sources 22 of the plurality of light sources 22.

Flow path 26 is a flow path through which an airflow produced by air blower 34 travels. Flow path 26 is a flow path that runs inside illumination device 10. Flow path 26 includes flow path 70, flow path 72, and flow path 74.

Flow path 70 is one example of a first flow path that, in a state in which illumination device 10 is mounted on ceiling 1, extends in a direction intersecting with the up and down direction and is located at the same position as at least one of light source 22 or light guide 24 in the up and down direction. In other words, in a state in which illumination device 10 is mounted on ceiling 1, flow path 70 extends in a direction intersecting with the up and down direction and is provided at the same height as at least one of light source 22 or light guide 24 in the up and down direction, as shown in FIG. 2, FIG. 5, and so forth.

According to the present embodiment, as shown in FIG. 3 and so forth, in a state in which illumination device 10 is mounted on ceiling 1, flow path 70 extends to the right side in the right and left direction and then extends to the front side in the front and back direction. Furthermore, in a state in which illumination device 10 is mounted on ceiling 1, flow path 70 is located at the same position as light source 22 and light guide 24 in the up and down direction, as shown in FIG. 2, FIG. 5, and so forth. In other words, in a state in which illumination device 10 is mounted on ceiling 1, flow path 70 is provided at the same height as light source 22 and light guide 24 in the up and down direction. Flow path 70 is located inward from light guide 24. Flow path 70 is formed by groove portion 40, cover portion 14, and so forth.

Flow path 72 is one example of a second flow path that opens at each of first surface 52 and second surface 54 and that is connected to the first flow path (flow path 70).

According to the present embodiment, flow path 72 is connected to one end portion of flow path 70 and is in communication with flow path 70. A portion of flow path 72 is formed by notch 58. Specifically, flow path 72 is formed by notch 58, substrate 18, and so forth. In this example, a plurality of flow paths 72 are connected to the one end portion of flow path 70.

Flow path 74 is one example of a second flow path that opens at each of first surface 52 and second surface 54 and that is connected to the first flow path (flow path 70).

According to the present embodiment, flow path 74 is connected to the other end portion of flow path 70 and is in communication with flow path 70. A portion of flow path 74 is formed by notch 58. Specifically, flow path 74 is formed by notch 58, main body portion 16, and so forth. In this example, a plurality of flow paths 74 are connected to the other end portion of flow path 70.

Flow path 28 is a flow path through which an airflow produced by air blower 36 travels. Flow path 28 is a flow path that runs inside illumination device 10. Flow path 28 includes flow path 76, flow path 78, and flow path 80.

Flow path 76 is one example of a first flow path that, in a state in which illumination device 10 is mounted on ceiling 1, extends in a direction intersecting with the up and down direction and is located at the same position as at least one of light source 22 or light guide 24 in the up and down direction. In other words, in a state in which illumination device 10 is mounted on ceiling 1, flow path 76 extends in a direction intersecting with the up and down direction and is provided at the same height as at least one of light source 22 or light guide 24 in the up and down direction, as shown in FIG. 2 and so forth.

According to the present embodiment, as shown in FIG. 3 and so forth, in a state in which illumination device 10 is mounted on ceiling 1, flow path 76 extends to the right side in the right and left direction and then extends to the back side in the front and back direction. Furthermore, in a state in which illumination device 10 is mounted on ceiling 1, flow path 76 is located at the same position as light source 22 and light guide 24 in the up and down direction, as shown in FIG. 2 and so forth. In other words, in a state in which illumination device 10 is mounted on ceiling 1, flow path 76 is provided at the same height as light sources 22 and light guide 24 in the up and down direction. Flow path 76 is located inward from light guide 24. Flow path 76 is formed by groove portion 42, cover portion 14, and so forth.

Flow path 78 is one example of a second flow path that opens at each of first surface 52 and second surface 54 and that is connected to the first flow path (flow path 76).

According to the present embodiment, flow path 78 is connected to one end portion of flow path 76 and is in communication with flow path 76. A portion of flow path 78 is formed by notch 58. Specifically, flow path 78 is formed by notch 58, substrate 18, and so forth. In this example, a plurality of flow paths 78 are connected to the one end portion of flow path 76.

Flow path 80 is one example of a second flow path that opens at each of first surface 52 and second surface 54 and that is connected to the first flow path (flow path 76).

According to the present embodiment, flow path 80 is connected to the other end portion of flow path 76 and is in communication with flow path 76. A portion of flow path 80 is formed by notch 58. Specifically, flow path 80 is formed by notch 58, main body portion 16, and so forth. In this example, a plurality of flow paths 80 are connected to the other end portion of flow path 76.

Flow path 30 is a flow path through which an airflow produced by air cleaner 38 travels. Flow path 30 is a flow path that runs inside illumination device 10. Flow path 30 includes flow path 82 and flow path 84.

Flow path 82 is one example of a first flow path that, in a state in which illumination device 10 is mounted on ceiling 1, extends in a direction intersecting with the up and down direction and is located at the same position as at least one of light source 22 or light guide 24 in the up and down direction. In other words, in a state in which illumination device 10 is mounted on ceiling 1, flow path 82 extends in a direction intersecting with the up and down direction and is provided at the same height as at least one of light source 22 or light guide 24 in the up and down direction.

According to the present embodiment, as shown in FIG. 3 and so forth, in a state in which illumination device 10 is mounted on ceiling 1, flow path 82 extends to the front side in the front and back direction. Furthermore, in a state in which illumination device 10 is mounted on ceiling 1, flow path 82 is located at the same position as light guide 24 in the up and down direction. In other words, in a state in which illumination device 10 is mounted on ceiling 1, flow path 82 is provided at the same height as light guide 24 in the up and down direction. Flow path 82 is located inward from light guide 24. Flow path 82 is formed by groove portion 44, cover portion 14, and so forth.

Flow path 84 is one example of a second flow path that opens at each of first surface 52 and second surface 54 and that is connected to the first flow path (flow path 82).

According to the present embodiment, flow path 84 is connected to one end portion of flow path 82 and is in communication with flow path 82. A portion of flow path 84 is formed by notch 58. Specifically, flow path 84 is formed by notch 58, main body portion 16, and so forth.

Flow path 32 is a flow path through which an airflow produced by air cleaner 38 travels. Flow path 32 is a flow path that runs inside illumination device 10. Flow path 32 includes flow path 86 and flow path 88.

Flow path 86 is one example of a first flow path that, in a state in which illumination device 10 is mounted on ceiling 1, extends in a direction intersecting with the up and down direction and is located at the same position as at least one of light source 22 or light guide 24 in the up and down direction. In other words, in a state in which illumination device 10 is mounted on ceiling 1, flow path 86 extends in a direction intersecting with the up and down direction and is provided at the same height as at least one of light source 22 or light guide 24 in the up and down direction.

According to the present embodiment, in a state in which illumination device 10 is mounted on ceiling 1, flow path 86 extends to the back side in the front and back direction. Furthermore, in a state in which illumination device 10 is mounted on ceiling 1, flow path 86 is located at the same position as light guide 24 in the up and down direction. In other words, in a state in which illumination device 10 is mounted on ceiling 1, flow path 86 is provided at the same height as light guide 24 in the up and down direction. Flow path 86 is located inward from light guide 24. Flow path 86 is formed by groove portion 46, cover portion 14, and so forth.

Flow path 88 is one example of a second flow path that opens at each of first surface 52 and second surface 54 and that is connected to the first flow path (flow path 86).

According to the present embodiment, flow path 88 is connected to one end portion of flow path 86 and is in communication with flow path 86. A portion of flow path 88 is formed by notch 58. Specifically, flow path 88 is formed by notch 58, main body portion 16, and so forth.

Air blower 34 produces an airflow that, having been sucked into illumination device 10, travels through flow path 70 and is blown out of illumination device 10 after having traveled through flow path 70 (see the thick dashed arrows shown in FIG. 2 to FIG. 5).

According to the present embodiment, the airflow produced by air blower 34 is sucked into illumination device 10 through between wall portion 48 and light guide 24, travels through flow path 72 after having been sucked into illumination device 10, travels through flow path 70 after having traveled through flow path 72, travels through flow path 74 after having traveled through flow path 70, and is blown out to the outside of illumination device 10 through between wall portion 48 and light guide 24 after having traveled through flow path 74 (see the thick dashed arrows shown in FIG. 2 and so forth). Air blower 34 is provided within flow path 70.

Air blower 36 produces an airflow that, having been sucked into illumination device 10, travels through flow path 76 and is blown out of illumination device 10 after having traveled through flow path 76 (see the thick dashed arrows shown in FIG. 2 and FIG. 3).

According to the present embodiment, the airflow produced by air blower 36 is sucked into illumination device 10 through between wall portion 48 and light guide 24, travels through flow path 78 after having been sucked into illumination device 10, travels through flow path 76 after having traveled through flow path 78, travels through flow path 80 after having traveled through flow path 76, and is blown out to the outside of illumination device 10 through between wall portion 48 and light guide 24 after having traveled through flow path (see the thick dashed arrows shown in FIG. 2 and so forth). Air blower 36 is provided within flow path 76.

Air cleaner 38 cleans the air in the interior of the vehicle with use of an airflow. According to the present embodiment, air cleaner 38 includes air blower 90. Air cleaner 38 produces an airflow that, having been sucked into illumination device 10, travels through flow path 82 (86) and is blown out of illumination device 10 after having traveled through flow path 82 (86) (see the thick dashed arrows shown in FIG. 3) and, with use of this airflow, air cleaner 38 cleans the air in the interior of the vehicle. For example, air cleaner 38 cleans the air in the interior of the vehicle by incorporating, into an airflow, a substance that includes a component for cleaning the air in the interior of the vehicle and by supplying this airflow into the interior of the vehicle. Herein, air cleaner 38 may be, for example but not limited to, a dust collector.

Thus far, illumination device 10 according to the present embodiment has been described.

Illumination device 10 according to the present embodiment is an illumination device to be mounted on ceiling 1 of an interior of a vehicle. Illumination device 10 includes light source 22 that emits light to illuminate the interior; light guide 24 that receives the light emitted from light source 22 and allows the received light to exit from light guide 24; a first flow path (flow path 70) that, in a state in which illumination device 10 is mounted on ceiling 1, extends in a direction intersecting with the up and down direction of the vehicle and is located at the same position as at least one of light source 22 or light guide 24 in the up and down direction; and air blower 34 that produces an airflow that, having been sucked into illumination device travels through the first flow path (flow path 70) and is blown out of illumination device 10 after having traveled through the first flow path (flow path 70).

According to this configuration, in a state in which illumination device 10 is mounted on ceiling 1, the first flow path (flow path 70) extends in a direction intersecting with the up and down direction of the vehicle and is located at the same position as at least one of light source 22 or light guide 24 in the up and down direction. This configuration, therefore, can prevent a situation in which the first flow path (flow path 70) aligns with at least one of light source 22 or light guide 24 in the up and down direction of the vehicle, which in turn can keep illumination device 10 from having a large dimension in the up and down direction of the vehicle.

Furthermore, in illumination device 10 according to the present embodiment, in a state in which illumination device 10 is mounted on ceiling 1, the first flow path (flow path 70) is located at the same position as light guide 24 in the up and down direction; light guide 24 includes first surface 52 on a side opposite a side facing the first flow path (flow path 70) and second surface 54 facing the first flow path (flow path 70); and illumination device 10 further includes a second flow path (flow path 72) that opens at each of first surface 52 and second surface 54 and is connected to the first flow path (flow path 70).

According to this configuration, the second flow path (flow path 72) opens at each of first surface 52 and second surface 54 of light guide 24 and is connected to the first flow path (flow path 70). Accordingly, even in a case in which the first flow path (flow path 70) and light guide 24 are located at the same position in the up and down direction of the vehicle in a state in which illumination device 10 is mounted on ceiling 1, the airflow can be kept from being obstructed by light guide 24.

Furthermore, in illumination device 10 according to the present embodiment, light guide 24 is recessed upward in the up and down direction in a state in which illumination device 10 is mounted on ceiling 1, and includes notch 58 formed from first surface 52 to second surface 54; and a portion of the second flow path (flow path 72) is formed by notch 58.

According to this configuration, a portion of the second flow path (flow path 72) can be formed easily with notch 58 in light guide 24.

Furthermore, in illumination device 10 according to the present embodiment, first surface 52 includes first inclined surface 64 that, in a state in which illumination device 10 is mounted on ceiling 1, is inclined in a direction away from where second surface 54 is located as a position on first inclined surface 64 moves upward in the up and down direction.

According to this configuration, the airflow blown out through an opening in first surface 52 can be made to travel along first inclined surface 64, and thus, in a state in which illumination device 10 is mounted on ceiling 1, the airflow can be made to travel diagonally upward.

Furthermore, illumination device 10 according to the present embodiment further includes housing 20 that opens upward in the up and down direction in a state in which illumination device 10 is mounted on ceiling 1 and that houses light source 22 and light guide 24; housing 20 includes wall portion 48 located on an opposite side of from first surface 52 from second surface 54; and first inclined surface 64 rises above wall portion 48 in the up and down direction in a state in which illumination device 10 is mounted on ceiling 1.

According to this configuration, in a state in which illumination device 10 is mounted on ceiling 1, the airflow blown out through an opening in first surface 52 can be made to travel diagonally upward with ease.

Furthermore, in illumination device 10 according to the present embodiment, in a state in which illumination device 10 is mounted on ceiling 1, light source 22 is located below light guide 24 in the up and down direction and emits light upward in the up and down direction; second surface 54 includes second inclined surface 68 that, in a state in which illumination device 10 is mounted on ceiling 1, is inclined toward where first surface 52 is located as a position on second surface 54 moves upward in the up and down direction; light guide 24 includes an entry surface (bottom surface 60) that is located above light source 22 in the up and down direction in a state in which illumination device 10 is mounted on ceiling 1 and that receives the light emitted from light source 22, and exit surface 56 that extends downward in the up and down direction from second surface 54 to first surface 52 in a state in which illumination device 10 is mounted on ceiling 1 and that allows the light that has entered light guide 24 via the entry surface (bottom surface 60) to exit from light guide 24; second inclined surface 68 reflects the light that has entered light guide 24 via the entry surface (bottom surface 60) toward first inclined surface 64; first inclined surface 64 reflects the light reflected by second inclined surface 68 toward exit surface 56; and exit surface 56 allows the light reflected by first inclined surface 64 to exit from light guide 24.

According to this configuration, the light emitted from light source 22 can be made to exit from light guide 24 after having been reflected within light guide 24, and thus the light emitted from light source 22 can be diffused, and the interior can be illuminated with this diffused light.

Furthermore, in illumination device 10 according to the present embodiment, exit surface 56 is a concave surface.

According to this configuration, the light emitted from light source 22 can be further diffused, and the interior can be illuminated with this further diffused light.

Furthermore, illumination device 10 according to the present embodiment includes a plurality of light sources 22 and housing 20 that houses the plurality of light sources 22 and light guide 24; in a state in which illumination device 10 is mounted on ceiling 1, the plurality of light sources 22 are arranged annularly along the outer peripheral portion of housing 20 as viewed in the up and down direction; and in a state in which illumination device 10 is mounted on ceiling 1, light guide 24 overlaps the plurality of light sources 22 and has an annular shape as viewed in the up and down direction.

According to this configuration, the surroundings of housing can be illuminated with ease.

Furthermore, illumination device 10 according to the present embodiment further includes air cleaner 38 that cleans the air in the interior of the vehicle with use of an airflow.

According to this configuration, the air in the interior of the vehicle can be cleaned with ease.

(Supplementary Notes)

Through the foregoing description of the embodiment and so forth, the following techniques are disclosed.

(Technique 1)

An illumination device to be mounted on a ceiling of an interior of a vehicle, the illumination device comprising:
- a light source that emits light to illuminate the interior;
- a light guide that receives the light emitted from the light source and transmits the light received;
- a first flow path that, in a state in which the illumination device is mounted on the ceiling, extends to intersect with an up and down direction of the vehicle and is located at a same position as at least one of the light source or the light guide in the up and down direction; and
- an air blower that produces an airflow that, having been sucked into the illumination device, travels through the first flow path and is blown out of the illumination device after traveling through the first flow path.

(Technique 2)

The illumination device according to technique 1, wherein
- the first flow path is located at a same position as the light guide in the up and down direction, in a state in which the illumination device is mounted on the ceiling,
- the light guide includes a first surface on a side opposite a side facing the first flow path and a second surface facing the first flow path, and
- the illumination device further comprises a second flow path that opens at each of the first surface and the second surface and is connected to the first flow path.

(Technique 3)

The illumination device according to technique 2, wherein
- the light guide includes a notch that is recessed upward in the up and down direction in a state in which the illumination device is mounted on the ceiling, the notch being formed from the first surface to the second surface, and
- a portion of the second flow path is formed by the notch.

(Technique 4)

The illumination device according to technique 2 or 3, wherein
- the first surface includes a first inclined surface that, in a state in which the illumination device is mounted on the ceiling, is inclined away from where the second surface is located as a position on the first inclined surface moves upward in the up and down direction.

(Technique 5)

The illumination device according to technique 4, further comprising:
- a housing that opens upward in the up and down direction in a state in which the illumination device is mounted on the ceiling, the housing housing the light source and the light guide, wherein the housing includes a wall portion located on an opposite side of the first surface from the second surface, and the first inclined surface rises above the wall portion in the up and down direction, in a state in which the illumination device is mounted on the ceiling.

(Technique 6)

The illumination device according to technique 4 or 5, wherein in a state in which the illumination device is mounted on the ceiling, the light source is located below the light guide in the up and down direction and emits the light upward in the up and down direction, the second surface includes a second inclined surface that, in a state in which the illumination device is mounted on the ceiling, is inclined toward where the first surface is located as a position on the second inclined surface moves upward in the up and down direction, the light guide includes an entry surface that is located above the light source in the up and down direction in a state in which the illumination device is mounted on the ceiling and that receives the light emitted from the light source, and an exit surface that extends downward in the up and down direction from the second surface to the first surface in a state in which the illumination device is mounted on the ceiling and that transmits the light received via the entry surface, the second inclined surface reflects the light that has entered the light guide via the entry surface toward the first inclined surface, the first inclined surface reflects the light reflected by the second inclined surface toward the exit surface, and the exit surface transmits the light reflected by the first inclined surface out of the light guide.

(Technique 7)

The illumination device according to technique 6, wherein the exit surface is a concave surface.

(Technique 8)

The illumination device according to any one of techniques 1 to 7, further comprising:

a plurality of light sources, each of the plurality of light sources being the light source; and a housing that houses the plurality of light sources and the light guide, wherein the plurality of light sources are arranged annularly along an outer peripheral portion of the housing as viewed in the up and down direction, in a state in which the illumination device is mounted on the ceiling, and the light guide overlaps the plurality of light sources and has an annular shape as viewed in the up and down direction, in a state in which the illumination device is mounted on the ceiling.

(Technique 9)

The illumination device according to any one of techniques 1 to 8, further comprising:

an air cleaner that cleans an air in the interior with use of the airflow.

Additional Embodiments and Others

Thus far, an illumination device according to one or more aspects has been described based on an embodiment, but the present disclosure is not limited by this embodiment. Unless departing from the spirit of the present disclosure, an embodiment obtained by making various modifications that a person skilled in the art can conceive of to the present embodiment may also be encompassed by the scope of the present disclosure.

In a case described above according to the embodiment, the first flow path is located at the same position as both light source 22 and light guide 24 in the up and down direction in a state in which illumination device 10 is mounted on ceiling 1. This configuration, however, is not a limiting example. For example, in a state in which the illumination device is mounted on the ceiling, the first flow path may be located at the same position as, of the light source and the light guide, only the light source in the up and down direction or may be located at the same position as, of the light source and the light guide, only the light guide in the up and down direction.

In a case described above according to the embodiment, illumination device 10 includes a plurality of light sources 22. This configuration, however, is not a limiting example. For example, the illumination device may include one light source, instead of a plurality of light source. In this case, for example, the light guide and the substrate do not have to have an annular shape, and the light guide and the substrate may be provided only in the vicinity of the light source.

In a case described above according to the embodiment, light source 22 is located below light guide 24 in a state in which illumination device 10 is mounted on ceiling 1. This configuration, however, is not a limiting example. For example, in a state in which the illumination device is mounted on the ceiling, the light source may be located above the light guide or may be located to the side of the light guide.

In a case described above according to the embodiment, illumination device 10 includes a second flow path. This configuration, however, is not a limiting example. For example, the illumination device does not have to include a second flow path. In this case, for example, a flow path through which the airflow that travels through a first flow path after having been sucked into the illumination device and that is blown out of the illumination device after having traveled through the first flow path may be positioned so as not to overlap the light guide as viewed in the up and down direction in a state in which the illumination device is mounted on the ceiling.

In a case described above according to the embodiment, light source 22 is housed in recess portion 50. This configuration, however, is not a limiting example. For example, the light guide does not have to include a recess portion, and the light source does not have to be housed in a recess portion.

In a case described above according to the embodiment, a portion of the second flow path is formed by notch 58. This configuration, however, is not a limiting example. For example, the light guide may include a through-hole that opens at each of the first surface and the second surface, and at least a portion of the second flow path may be formed by this through-hole.

In a case described above according to the embodiment, illumination device 10 is mounted on ceiling 1 of the interior of the vehicle such that FIG. 1 serves as a diagram in which illumination device 10 and so forth are viewed from the front side in the front and back direction of the vehicle and FIG. 2 serves as a diagram in which the section orthogonal to the right and left direction of the vehicle is viewed from the left side in the right and left direction of the vehicle. This configuration, however, is not a limiting example. For example, illumination device 10 may be mounted on ceiling 1 of the interior of the vehicle such that FIG. 1 serves as a diagram in which illumination device 10 and so forth are viewed from the right side or the left side in the right and left direction of the vehicle and FIG. 2 serves as a diagram in which the section orthogonal to the front and back direction of the vehicle is viewed from the front side or the back side in the front and back direction of the vehicle.

In this case, for example, flow path 70 extends to the back side in the front and back direction and then extends to the left side in the right and left direction in a state in which illumination device 10 is mounted on ceiling 1, flow path 76 extends to the back side in the front and back direction and then extends to the right side in the right and left direction in a state in which illumination device 10 is mounted on ceiling 1, flow path 82 extends to the left side in the right and left direction in a state in which illumination device 10 is mounted on ceiling 1, and flow path 86 extends to the right side in the right and left direction in a state in which illumination device 10 is mounted on ceiling 1.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims are incorporated herein by reference in their entirety: Japanese Patent Application No. 2022-121585 filed on Jul. 29, 2022.

INDUSTRIAL APPLICABILITY

The present disclosure can find its use in an illumination device to be provided in an interior of a vehicle.

The invention claimed is:

1. An illumination device to be mounted on a ceiling of an interior of a vehicle, the illumination device comprising:
    a light source that emits light to illuminate the interior;
    a light guide that receives the light emitted from the light source and transmits the light received;
    a first flow path that, in a state in which the illumination device is mounted on the ceiling, extends to intersect with an up and down direction of the vehicle and is located at a same position as at least one of the light source or the light guide in the up and down direction; and
    an air blower that produces an airflow that, having been sucked into the illumination device, travels through the first flow path and is blown out of the illumination device after traveling through the first flow path.

2. The illumination device according to claim 1, wherein the first flow path is located at a same position as the light guide in the up and down direction, in a state in which the illumination device is mounted on the ceiling, the light guide includes a first surface on a side opposite a side facing the first flow path and a second surface facing the first flow path, and the illumination device further comprises a second flow path that opens at each of the first surface and the second surface and is connected to the first flow path.

3. The illumination device according to claim 2, wherein the light guide includes a notch that is recessed upward in the up and down direction in a state in which the illumination device is mounted on the ceiling, the notch being formed from the first surface to the second surface, and a portion of the second flow path is formed by the notch.

4. The illumination device according to claim 2, wherein the first surface includes a first inclined surface that, in a state in which the illumination device is mounted on the ceiling, is inclined away from where the second surface is located as a position on the first inclined surface moves upward in the up and down direction.

5. The illumination device according to claim 4, further comprising:
    a housing that opens upward in the up and down direction in a state in which the illumination device is mounted on the ceiling, the housing housing the light source and the light guide, wherein
    the housing includes a wall portion located on an opposite side of the first surface from the second surface, and
    the first inclined surface rises above the wall portion in the up and down direction, in a state in which the illumination device is mounted on the ceiling.

6. The illumination device according to claim 4, wherein
    in a state in which the illumination device is mounted on the ceiling, the light source is located below the light guide in the up and down direction and emits the light upward in the up and down direction,
    the second surface includes a second inclined surface that, in a state in which the illumination device is mounted on the ceiling, is inclined toward where the first surface is located as a position on the second inclined surface moves upward in the up and down direction,
    the light guide includes an entry surface that is located above the light source in the up and down direction in a state in which the illumination device is mounted on the ceiling and that receives the light emitted from the light source, and an exit surface that extends downward in the up and down direction from the second surface to the first surface in a state in which the illumination device is mounted on the ceiling and that transmits the light received via the entry surface,
    the second inclined surface reflects the light that has entered the light guide via the entry surface toward the first inclined surface,
    the first inclined surface reflects the light reflected by the second inclined surface toward the exit surface, and
    the exit surface transmits the light reflected by the first inclined surface out of the light guide.

7. The illumination device according to claim 6, wherein the exit surface is a concave surface.

8. The illumination device according to claim 1, further comprising:
    a plurality of light sources, each of the plurality of light sources being the light source; and
    a housing that houses the plurality of light sources and the light guide, wherein
    the plurality of light sources are arranged annularly along an outer peripheral portion of the housing as viewed in the up and down direction, in a state in which the illumination device is mounted on the ceiling, and
    the light guide overlaps the plurality of light sources and has an annular shape as viewed in the up and down direction, in a state in which the illumination device is mounted on the ceiling.

9. The illumination device according to claim 1, further comprising:
    an air cleaner that cleans an air in the interior with use of the airflow.

* * * * *